United States Patent [19]

Rees et al.

[11] Patent Number: 5,109,093

[45] Date of Patent: * Apr. 28, 1992

[54] PROCESS FOR PRODUCING ORGANOSILICON PRODUCTS

[75] Inventors: Sian B. Rees, Llantwit Fardre; Stephen Westall, Barry, both of Wales

[73] Assignee: Dow Corning Limited, Barry, Wales

[ * ] Notice: The portion of the term of this patent subsequent to Apr. 28, 2009 has been disclaimed.

[21] Appl. No.: 473,080

[22] Filed: Jan. 31, 1990

[30] Foreign Application Priority Data

Feb. 9, 1989 [GB] United Kingdom ................ 8902935

[51] Int. Cl.$^5$ ............................................ C08G 77/06
[52] U.S. Cl. ..................... 528/14; 556/450; 556/462
[58] Field of Search ................... 528/14; 556/450, 462

[56] References Cited

U.S. PATENT DOCUMENTS

| | | | |
|---|---|---|---|
| 3,094,497 | 6/1963 | Hyde | 260/18 |
| 3,448,076 | 6/1969 | Bluestein | 528/14 |
| 3,642,693 | 2/1972 | Jasinski | 528/14 |
| 5,039,771 | 8/1991 | Morimoto et al. | 528/33 |

Primary Examiner—Melvyn J. Marquis
Attorney, Agent, or Firm—Sharon K. Severance

[57] ABSTRACT

A process for the preparation of an organosilicon condensation product which comprises reacting together at a temperature of at least 50° C. (A) an organosilicon compound having in the molecule at least one silicon-bonded hydroxyl group; and (B) an organosilicon compound having in the molecule at least one silicon-bonded —OX group, in which X respresents an alkyl group having from 1 to 8 carbon atoms or an alkoxyalkyl group having from 2 to 8 carbon atoms, in the presence of a catalytic substance which is selected from strontium hydroxide and barium hydroxide.

8 Claims, No Drawings

PROCESS FOR PRODUCING ORGANOSILICON PRODUCTS

This invention relates to a process for the production of organosilicon products and is concerned in particular with a process for the condensation of organosilicon compounds having silicon-bonded hydroxyl groups.

In the synthesis of organosilicon products it is often desired to react organosilicon compounds containing silanol ($\equiv$SiOH) groups with other organosilicon compounds. Specific and commercially important examples of such a reaction occur in the production of triorganosiloxy end stopped polydiorganosiloxanes and in the production of polysiloxanes having silicon-bonded organofunctional, for example mercaptoalkyl, groups. Triorganosiloxy end-stopped polydiorganosiloxanes and organofunctional polysiloxanes can be prepared by an equilibration process involving the reaction of silanol-terminated polydiorganosiloxanes with a source of end-stopping units or organofunctional siloxane units, such as hexamethyldisiloxane or cyclic organo-functional siloxanes, in the presence of an equilibration catalyst. Many such catalysts are known and include sulphuric acid, hydrochloric acid, Lewis acids, potassium hydroxide and tetramethylammonium hydroxide. Although effective in producing the desired polysiloxane such equilibration catalysts cause scission and random rearrangement of the siloxane bonds. As a result of such rearrangement the product often contains a significant proportion of low molecular weight siloxanes. For many applications, for example in the production of silicone elastomers the presence of such low molecular weight materials is undesirable. Random rearrangement of the siloxane bonds is also undesirable when the polysiloxane is to contain a planned arrangement of two or more types of organic substituents.

A method for the production of organosilicon products which avoids the occurrence of siloxane bond scission and rearrangement has been disclosed in British Patent 918 823. According to said method silanol-containing organosilicon compounds can be condensed with organosilicon compounds having $\equiv$SiOR groups, wherein R is organic, employing catalysts which are certain salts of a phosphoric acid or a carboxylic acid with an amino compound. However, many such catalysts are liquids, or are not suitable for use at high temperatures or are not readily removable from the product. There has therefore existed a need for improved catalysts for the reaction of organosilicon compounds having $\equiv$SiOH groups with those having $\equiv$SiOR groups. In particular, the desired catalysts should be suitable for use in heterogeneous reaction systems thereby facilitating their separation from the desired reaction product and preferably enabling their recovery and re-use in batch processes or their application in a continuous process.

According to the present invention there is provided a process for the preparation of an organosilicon condensation product which comprises reacting together at a temperature of at least 50° C. (A) an organosilicon compound having in the molecule at least one silicon-bonded hydroxyl group and wherein the organic substituents are selected from monovalent hydrocarbon groups having from 1 to 18 carbon atoms and monovalent substituted hydrocarbon groups having from 1 to 10 carbon atoms said substituted hydrocarbon groups being non-acidic in character, and (B) an organosilicon compound having in the molecule at least one —OX group wherein X represents an alkyl group having from 1 to 8 carbon atoms or an alkoxyalkyl group having from 2 to 8 carbon atoms, any remaining silicon-bonded substituents in the organosilicon compound being selected from monovalent hydrocarbon groups having from 1 to 18 carbon atoms and monovalent substituted hydrocarbon groups having from 1 to 10 carbon atoms, said substituted hydrocarbon groups being non-acidic in character, in the presence of a catalyst substance (C) which is strontium hydroxide and/or barium hydroxide.

The process of this invention may be applied in the production of condensation products of any types of organosilicon compounds (A) and (B) provided that (A) has therein bonded directly to a silicon atom at least one hydroxyl group and (B) at least one —OX group similarly bonded. Thus the organosilicon compounds (A) and (B) may be both organosilanes or both organosiloxanes or one may be an organosiloxane and the other an organosilane. As the silicon-bonded organic substituents in the organosilicon compounds (A) and (B) there may be present monovalent hydrocarbon groups such as alkyl, alkenyl, aryl, aralkyl and alkaryl groups or non-acidic monovalent substituted hydrocarbon groups, that is groups not containing acidic substituents such as carboxyl, sulphate and sulphonic. Examples of operative non-acidic groups are amino-substituted alkyl and aryl groups, mercaptoalkyl groups, haloalkyl groups, esterified carboxyalkyl groups and hydroxyalkyl groups. Specific examples of organic substituents which may be present in the organosilicon compounds employed in the process of this invention are methyl, ethyl, propyl, hexyl, dodecyl, tetra- decyl, phenyl, xylyl, tolyl, phenylethyl, vinyl, allyl, hexenyl, —R''NH$_2$, —R''NHCH$_2$CH$_2$NH$_2$, —R''SH, —R''Br, —R''Cl and —R''OH wherein R'' represents a divalent organic group, preferably having less than 8 carbon atoms, for example alkylene, e.g. —(CH$_2$)$_3$—, —(CH$_2$)$_4$— and —CH$_2$CHCH$_3$CH$_2$—, arylene e.g. —C$_6$H$_4$— and alkylene e.g. —(C$_6$H$_4$CH$_3$)—.

Although applicable in the production of a variety of organosilicon products by a condensation reaction the process of this invention is of particular interest with regard to the manufacture of end-stopped polydiorganosiloxanes and polyorganosiloxanes having therein organofunctional substituents, that is substituted hydrocarbon groups such as amidoalkyl, chloroalkyl, mercaptoalkyl, cyanoalkyl and hydroxyalkyl groups. Preferably, therefore, organosilicon compounds (A) are silanol-terminated polydiorganosiloxanes, that is substantially linear organosiloxane polymers or oligomers having a hydroxyl group attached to each terminal silicon atom and organosilicon compounds (B) are silanes having from 1 to 3 —OX groups per molecule. The preferred organosilicon compounds (A) can be represented by the average general formula

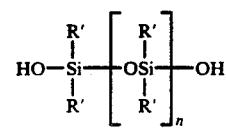

wherein each R' represents an organic substitute as hereinabove defined and n is an integer preferably having a value of from 1 to about 300. In commercial practice of the invention at least 50% of the total R' substituents will normally be methyl with any remaining substituents being selected from vinyl, phenyl and haloalkyl. Said hydroxyl-terminated polydiorganosiloxanes are well known, commercially available materials and can be prepared by known methods. The low molecular weight polymers and oligomers can be obtained by the hydrolysis of diorganodihalosilanes. These may then be subjected to polymerisation procedures as desired employing equilibration or condensation catalysts to obtain polydiorganosiloxanes of the desired molecular weight. The preferred organosilicon compounds (B) may be represented by the general formula $GySi(OX)_{4-y}$ wherein y has a value of 1, 2 or 3, G represents a monovalent hydrocarbon group having from 1 to 18 carbon atoms or a monovalent substituted hydrocarbon group having from 1 to 10 carbon atoms and X is as hereinbefore defined. Preferably X represents an alkyl group having from 1 to 3 inclusive carbon atoms and each G is selected from methyl, phenyl, vinyl, aminoalkyl, (polyamino)alkyl, mercaptoalkyl, amidoalkyl and cyanoalkyl. Specific examples of the preferred organosilicon compounds (B) are, therefore, $(CH_3)_3Si(OC_2H_5)$, $C_6H_5Si(OCH_3)_3$, $(CH_2=CH)(CH_3)(C_6H_5)SiOCH_3$, $CH_3(CH_2=CH)Si(OC_2H_5)_2$, $H_2N(CH_2)_3Si(CH_3)(OC_4H_9)_2$, $H_2NCH_2CH_2NHCH_2CH.CH_3CH_2Si(OC_2H_5)_3$, $HS(CH_2)_3SiCH_3(OC_3H_7)_2$, $Cl(CH_2)_3Si(OCH_3)_3$ and $F_3C(CH_2)_4Si(CH_3)(OC_2H_5)_2$.

As the catalyst substance (C) there is employed strontium hydroxide or barium hydroxide or both. They may be employed in their anhydrous or in their hydrated forms. The particle size of the catalyst substance (C) is not critical. Generally, the smaller the particles the greater is the catalytic surface available for a given weight of catalyst. However, very fine particle size powders may be more difficult to remove from the condensation product.

The process of this invention involves reacting together organosilicon compounds (A) and (B) in the presence of catalyst (C) at a temperature of at least 50° C. Reaction temperatures from 50° C. to about 250° C. may be employed. Reaction at the lower temperatures is, however, slow and the use of the higher temperatures is generally economically undesirable in terms of energy costs or where one or both reactants are volatile. In general therefore we prefer to carry out the reaction between (A) and (B) at a temperature in the range from about 60° C. to about 180° C. Volatile by-products and excess volatile reactant may be removed by distillation, if necessary or desired under reduced pressure, or by any other suitable means.

One method of carrying out the process of this invention is by way of a batch procedure. For example, the catalyst may be dispersed in the mixture of (A) and (B) and the mixture raised to the required reaction temperature. Alternatively, the catalyst may be dispersed in either (A) or (B) prior to bringing all of the reaction components together and raising the temperature. Advantageously the mixture is agitated during the reaction period to maintain the catalyst in suspension. Sufficient catalyst is employed to achieve the desired rate of condensation having regard to the nature and geometry of the processing equipment, temperature and other factors. From considerations of speed of reaction and economy of operation we prefer to employ from about 0.001 to about 5% by weight of the catalyst based on the total weight of the organosilicon compounds. Termination of the condensation reaction, if desired, may be achieved by lowering the temperature of the mixture and/or by separation or neutralisation of the catalyst.

Because of their heterogeneous nature the catalysts (C) are particularly adapted for use in processes involving manufacture on a continuous, rather than a batch, basis. Properly employed such so-called 'continuous processes' avoid the delays and costs common to batch processing, for example those involved in the charging and discharging of the reaction vessel and separation of the catalyst material from the product. Thus, for example, the process of this invention may be advantageously employed for the continuous production of end-stopped and/or organofunctional siloxane polymers. When carrying out the process of this invention in a continuous mode contact between the catalyst material and the organosilicon compounds may be achieved by passing the mixture of organosilicon compounds over or through a bed containing the catalyst material (C). When employing viscous reactants or products it may be necessary to adjust the porosity of the bed by granulation of the catalyst or other means. We have found that a particularly suitable form of bed for continuous operation can be obtained by depositing the catalyst substance in or on an inert particulate material, for example silica, having a particle size appropriate to the desired porosity of the bed.

If desired the condensation product obtained by the reaction of (A) and (B) can be subjected to a polymerisation step which comprises contacting it with a second catalyst which is effective in catalysing the condensation of residual silanol groups in the condensation product with each other. Preferred as catalysts for this purpose are the borates and phosphates of sodium and potassium, for example $Na_3PO_4$ and $K_2B_4O_7$. Such polymerisation may be performed as a separate polymerisation procedure following recovery of the condensation product from the reaction mixture. More conveniently, however, when batch processing is employed, the second (polymerisation) catalyst may be added to the reaction mixture prior to separation and recovery of the condensation product.

The condensation products obtained by the process of this invention may be employed in any of the variety of applications known for the corresponding products produced by prior art processes. For example, they may be used as textile treatments to impart water repellency and/or softness, as components of paper coating compositions, as heat transfer fluids and in the production of adhesives and sealing materials.

The following Examples in which Me represents the methyl group and Vi the vinyl group illustrate the invention.

EXAMPLE 1

201 g of a silanol-terminated polydimethylsiloxane, having a silicon-bonded OH content of 12,408 ppm, viscosity of $87.2 \times 10^{-6}$ m$^2$/s at 25° C. and Mn of 2740, was mixed with 18.4 g of ViMe$_2$Si(OMe) and 2.03 g of Ba(OH)$_2$8H$_2$O. The mixture was agitated vigorously and heated to reflux temperature (88° C.) at atmospheric pressure for 4 hours. The temperature of the reaction mixture was then raised to 130° C. for a further 4 hour period, after which the mixture was allowed to cool and filtered to remove the catalyst. A vinyldimethylsilyl-terminated polydimethylsiloxane was obtained having a residual silicon-bonded hydroxyl content of 417 ppm, a viscosity at 25° C. of $128 \times 10^{-6}$ m$^2$/s and a vinyl content of 1.81 by weight (theory=1.95%).

EXAMPLE 2

To HO(Me$_2$SiO)$_{11}$H (1053 g) were added with mixing (MeO)$_2$MeSi(CH$_2$)$_{13}$CH$_3$ (124 g), (MeO)$_2$MeSiCH=CH$_2$ (54 g) and strontium hydroxide (12.31 g). The mixture was then heated under reflux at 120° C. for 4 hours, allowed to cool and filtered to remove the strontium hydroxide. The product was heated to 120° C. under a pressure of 5 mbar to remove volatile substances and leave a polymer having the average formula

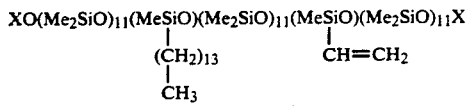

in which about 50% of the X groups are Me groups and the remainder H atoms.

EXAMPLE 3

200 g of an α,ω silanol-terminated polydimethylsiloxane of Mn 3300 and viscosity of 92×10$^{-6}$ m$^2$/s at 25° C., was mixed with 12.5 g of (MeO)$_2$SiMeCH$_2$CH$_2$CH$_2$NHCH$_2$CH$_2$NH$_2$ and 5.92 g of Me$_3$SiOMe. Barium hydroxide octahydrate, 0.2 g was added to the mixture which was then refluxed at 85° C. for four hours at atmospheric pressure. Trisodium orthophosphate dodecahydrate, 0.2 g was added to the mixture which was then heated to 104° C. at −0.99 bar gauge pressure for 4 hours. During this time volatiles were removed by distillation. The reaction mixture was then cooled and filtered to yield 190 g of an aminosiloxane polymer of average structure

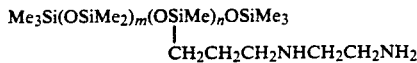

where m/n=48/1 and having a viscosity of 211×10$^{-6}$ m$^2$/s at 25° C. and a non-volatile content of 95.5% wt/wt measured over 2 hours at 150° C.

EXAMPLE 4

800 g of an α,ω silanol-terminated siloxane of average structure HO(SiMe$_2$O)$_n$H where n=about 35, was mixed together with 16.6 g of CH$_2$=CHCH$_2$CH$_2$CH$_2$SiMe$_2$OMe and 41.5 g of CH$_2$=CHCH$_2$CH$_2$CH$_2$SiMe(OMe)$_2$. Ba(OH)$_2$.8H$_2$O, 0.86 g was added to the mixture which was then refluxed for six hours at 90° C. and atmospheric pressure. After this time Na$_3$PO$_4$.12H$_2$O, 0.45 g was added to the mixture and heating was continued at 105° C. and 5-10 mm.Hg pressure for a further 3 hours. During this time methanol and water were removed by distillation. The mixture was cooled and filtered to yield 795 g of a siloxane polymer of average structure

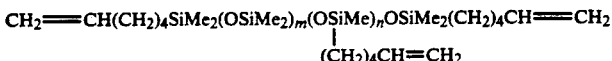

where m/n=48.5/1 and having a viscosity of 185×10$^{-6}$ m$^2$/s at 25° C. and a residual hydroxyl content of 150 ppm by weight (as OH).

EXAMPLE 5

300 g of an α,ω silanol-terminated siloxane of average structure HO(SiMe$_2$O)$_n$H, where n=11, was mixed with 6 g of Me$_3$SiOMe and 10 g of cumene-an internal standard. Sr(OH)$_2$8H$_2$O (7.4 g) was added to the mixture at 120° C. Heating was continued at 110° C. for an hour at atmospheric pressure during which time samples were taken periodically via a septum and analyzed by capillary gas liquid chromatography. Reaction of HO(SiMe$_2$O)$_{11}$H and Me$_3$SiOMe was observed with the liberation of MeOH and the formation of Me$_3$SiOSi— bond.

The weight and hence molar concentration of Me$_3$SiOMe was calculated for each sample. Analysis of the data indicates a pseudo first-order reaction. Integrated rate expressions were plotted versus time, from which a rate constant of 6.67×10$^4$ per second at 110° C. was calculated for the reaction of Me$_3$SiOMe and HOSi≡.

That which is claimed is:

1. A process for the preparation of an organosilicon condensation product which comprises reacting together at a temperature of t least 50° C. (A) an organosilicon compound having in the molecule at least one silicon-bonded hydroxyl group and wherein the organo substituents are selected from the group consisting of monovalent hydrocarbon groups having from 1 to 18 carbon atoms and monovalent substituted hydrocarbon groups having from 1 to 10 carbon atoms said substituted hydrocarbon groups being non-acidic in character, and (B) an organosilicon compound having in the molecule at least one —OX group wherein X represents and alkyl group having from 1 to 8 carbon atoms, or an alkoxyalkyl group having from 2 to 8 carbon atoms, any remaining silicon-bonded substituents in the organosilicon compound being selected from the group consisting of monovalent hydrocarbon groups having from 1 to 18 carbon atoms and monovalent substiuented hydrocarbon groups having from 1 to 10 carbon atoms, said substituted hydrocarbon groups being non-acidic in character, in the presence of a catalyst substance (C) which is selected from the group consisting of strontium hydroxide, barium hydroxide and mixtures thereof.

2. A process as claimed in claim 1 wherein (A) and (B) are reacted at a temperature in the range from 60° C. to 180° C.

3. A process as claimed in claim 1 wherein organosilicon compound (A) is a silanol-terminated polydiorganosiloxane.

4. A process as claimed in claim 1 wherein (B) is a compound falling within the general formula G$_y$Si(OX)$_{4-y}$ wherein y has a value of 1, 2 or 3, G represents a monovalent hydrocarbon group having from 1 to 10 carbon atoms or a monovalent substituted hydrocarbon group having from 1 to 10 carbon atoms and X represents an alkyl group having from 1 to 8 carbon atoms or an alkoxyalkyl group having from 2 to 8 carbon atoms.

5. A process as claimed in claim 4 wherein X represents an alkyl group having from 1 to 3 carbon atoms.

6. A process as claimed in claim 1 which comprises passing a mixture of (A) and (B) over or through a bed containing (C).

7. A process as claimed in claim 1 wherein (C) is present

8. A process as claimed in claim 1 which also comprises contacting the condensation product with a second catalyst which is effective in catalysing a reaction between residual silanol groups in said condensation product.

* * * * *